Aug. 13, 1968  G. R. COOK  3,396,836
HOLDER FOR GLUE COMPONENTS
Filed June 19, 1967
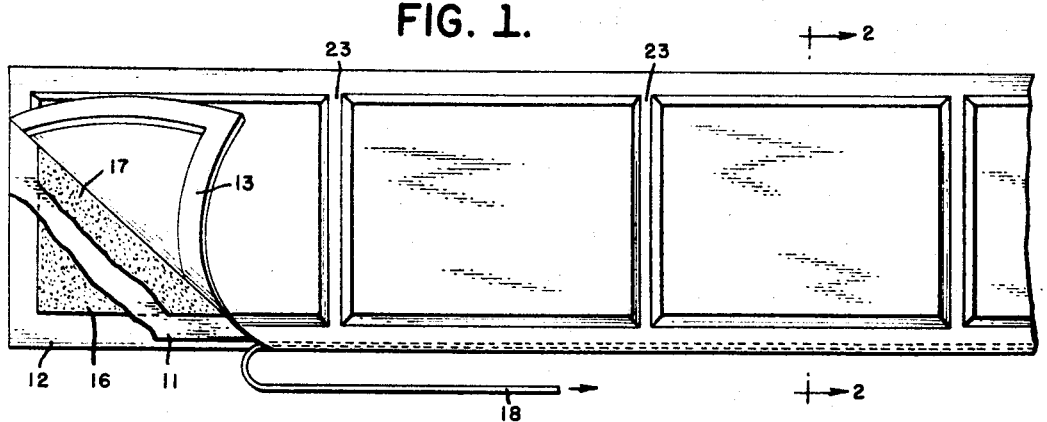
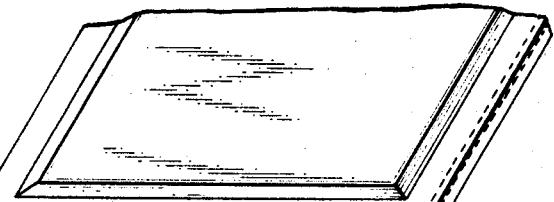
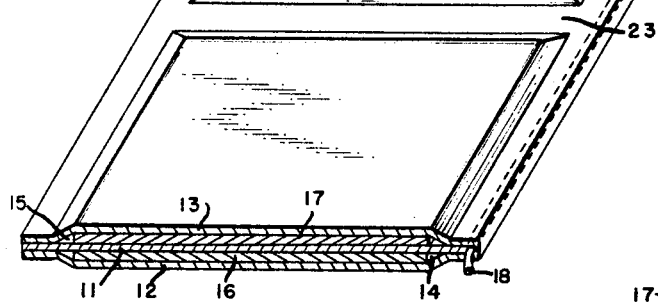
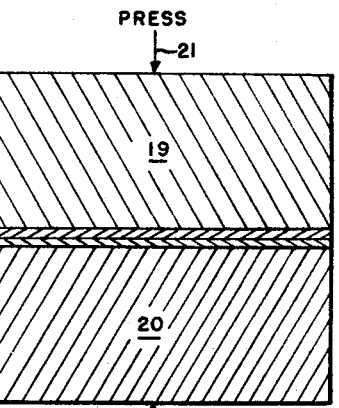
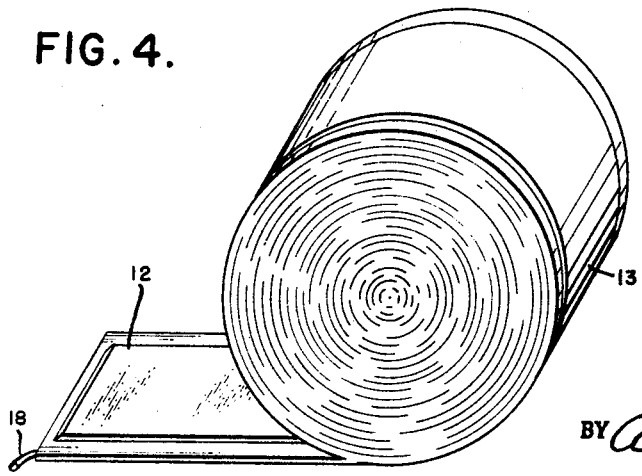
INVENTOR
GEORGE R. COOK
BY Albert J. Kramer
ATTORNEY

United States Patent Office 3,396,836
Patented Aug. 13, 1968

3,396,836
HOLDER FOR GLUE COMPONENTS
George R. Cook, Rochester, N.Y., assignor to Cutler Mail Chute Company, Inc., Rochester, N.Y., a corporation of New York
Filed June 19, 1967, Ser. No. 646,833
8 Claims. (Cl. 206—47)

ABSTRACT OF THE DISCLOSURE

A holder for the mutually reactive components of a glue, such as that of an epoxy resin, has three overlying layers of liquid impervious tearable sheets. These sheets are mutually secured together along marginal edges forming two separate and distinct pockets. The pockets contain porous sheets of material, like gauze, impregnated with the components, respectively. Conventional tear strips may be provided to facilitate opening the pockets and removing the impregnated sheets of gauze which are used by overlaying them under pressure between members to be joined. The pressure is effective to blend the components in this state sufficient to cause the required typical chemical reaction which produces the final epoxy resin. Alternatively, the blending may be effected by the application of heat at about 200° C.

---

This invention relates to gluing and it is more particularly concerned with a novel method and means for applying reactive epoxy resin components between parts to be glued together.

The general object of the invention is the provision of a relatively simple device by which reactive components of an epoxy resin can be quickly and effectively sandwiched between members to be joined.

A specific object is the provision of unitary means for indefinitely holding the two components in isolated relation relative to each other with means making it readily simple to apply superimposed layers of the components to members to be joined.

Another object is the provision of such means which obviates the necessity for mixing the components prior to application to the members to be joined.

A still further object is the provision of a multilayered tape which contains the components in a sealed condition relative to each other and by means of which a desired section of tape may be severed and applied to members to be joined.

These and still further objects, advantages and features of the invention will be apparent from the following description considered together with the accompanying drawing.

In the drawing:

FIG. 1 is a top plan view of one embodiment of the invention.

FIG. 2 is a perspective view of a portion of the same embodiment cut off along the line 2—2 of FIG. 1.

FIG. 3 is a diagrammatic sectional view illustrating the manner of using the invention between two members to be joined.

FIG. 4 is a perspective view of a roll of multilayered tape comprising another embodiment of the invention.

Referring to the drawing with more particularity the embodiment illustrated in FIGS. 1 and 2 comprises a center section 11 and two outside sections 12 and 13, respectively, each of an imperforate material, such as sheet rubber, rubber coated fabric, plastic sheet material, cellophane, etc. The outer marginal edges of these sections are mutually secured together forming a pocket 14 between the sections 11 and 12 and another pocket 15 between the sections 11 and 13.

Each pocket 14 and 15 contains a sheet of porous material 16 and 17, respectively, such as of gauze, tissue paper, cheesecloth, fiberglass, polyurethane foam sheets, or other such open mesh material. Each sheet of porous material is impregnated with one of the two conventional mutually reactive components of an epoxy resin. Such epoxy resin components are well known in the art, are available commercially from numerous sources as a common household product and, therefore, need not be further described herein.

To facilitate opening the pockets, a tear string 18 is provided in the conventional manner as in other products, such as in packages of chewing gum, cigarettes, etc.

By virtue of the pockets 14 and 15 and their impervious walls the resin components are retained indefinitely without change until it is desired to use them. A section is cut off corresponding in size to the area of the joint to be formed such as a joint between two members 19 and 20.

By means of the tear string 18 the pockets are opened exposing the impregnated materials 16 and 17 which are removed from the pockets and placed in a superimposed position in the joint such as between the members 19 and 20. Pressure is then applied to the joint as indicated by the force arrows 21 and 22. This pressure has the effect of causing the compounds to intermingle in this state and blend to a degree sufficient to cause the required typical chemical reaction which produces the final epoxy resin.

Alternatively, heat may be applied to the layers of impregnated materials 16 and 17 on the order of about 200° C. This produces a blending by increased molecular action of the two components to an extent sufficient to develop the desired reaction.

The strip may be provided in a continuous form as shown in FIG. 3 wherein the pockets 14 and 15 are continuous from one end to the other; or it may be provided in the form shown in FIGS. 1 and 2 whereby individual pairs of pockets are provided extending in a series lengthwise of the strips, each pair of pockets being separated from its adjacent pair by a transverse closure 23 similar to that provided along the outer marginal edges.

I claim:

1. A device of the character described comprising three overlying strips of liquid impervious tearable sheet material mutually secured together along their marginal edges forming two separate and distinct pockets, said pockets containing porous sheets saturated, respectively, with mutually reactive resin glue components.

2. A device as defined by claim 1 and tear strings connected with the pockets.

3. A device as defined by claim 1 in which the pockets are elongated and continuous throughout the length of the strips.

4. A device as defined by claim 1 in which a plurality of consecutive pockets is provided lengthwise of the strips.

5. A device as defined by claim 1 in which the porous sheets comprise gauze.

6. A device as defined by claim 1 in which the porous sheets comprise tissue paper.

7. A device as defined by claim 1 in which the porous sheets comprise fiberglass.

8. A device as defined by claim 1 in which the porous sheets comprise sheets of polyurethane foam.

References Cited

UNITED STATES PATENTS 3,082,867  3/1963  Gelpey _____ 206—47

FOREIGN PATENTS 1,215,472  11/1959  France.

MARTHA L. RICE, *Primary Examiner.*